United States Patent Office 2,953,420
Patented Sept. 20, 1960

2,953,420

PROCESS FOR THE DYEING OF ARTICLES OF POLYACRYLONITRILE

Walter Hees, Koln-Hohenberg, Mathieu Quaedvlieg, Leverkusen-Bayerwerk, and Gerhard Rühlig, Leverkusen, Germany, assignors to Farbenfabriken Bayer Aktiengesellschaft, Leverkusen, Germany, a corporation of Germany No Drawing. Filed Feb. 12, 1958, Ser. No. 714,701

Claims priority, application Germany Feb. 15, 1957

3 Claims. (Cl. 8—4)

The present invention relates to a process for the dyeing of articles of polyacrylonitrile with basic dyestuffs or dispersed dyestuffs. More particularly it concerns a process which consists in carrying out the dyeing in the presence of amidoamines of the general formula

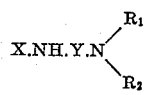

wherein X stands for the acid residue of a high molecular weight carboxylic or sulfonic acid and Y represents a straight-chain or branched alkylene radical having 2–6 carbon atoms, whereas $R_1$ and $R_2$ stand for the same or different straight-chain or branched alkyl radicals having each 1–4 carbon atoms.

By high molecular weight carboxylic acids there are to be understood especially those having 10–18 carbon atoms, saturated or unsaturated, and having a straight or branched chain and whose carbon chain may be interrupted by hetero atoms; the same applies to the sulfonic acids. There may be mentioned, for example, lauric acid, myristic acid, palmitic acid, stearic acid and oleic acid, further the sarcosides which correspond to the aforesaid fatty acids, and the ether carboxylic acids containing the same number of carbon atoms. As representatives of the high molecular weight sulfonic acids there may be mentioned the sulfonic acids which are obtainable by sulfochlorination of hydrocarbons having an average of 15 carbon atoms, and subsequent saponification. The amidoamines to be applied according to the invention can be prepared from the high molecular weight carboxylic or sulfonic acids and the corresponding diamines of the general formula

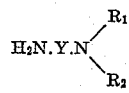

wherein Y, $R_1$ and $R_2$ have the same meaning as indicated above, in a manner known per se, i.e. by heating the carboxylic acids with the diamines in a molecular ratio of 1:1 to temperatures of 140–180° C. or by reacting the sulfonic acid chlorides with the diamines in a molecular ratio of 1:1.

The proposed amidoamines may be used as such, or more advantageously in the form of their water-soluble salts, for example, in the form of their salts with hydrochloric acid, acetic acid or formic acid. Furthermore, very good results are obtained if the amidoamines are applied in the form of the quaternized products obtainable by contacting the amidoamines in a manner known per se with quaternizing agents, for instance with benzyl chloride or chloracetic acid.

The quantities of the amidoamines, their salts or their quaternization products required in carrying out the process of the invention may readily be established in each case by preliminary experiments; in general quantities of about 1–3 percent by weight calculated on the material to be dyed have been found sufficient.

Suitable basic dyestuffs and disperse dyestuffs are described inter alia in America Dyestuff Reporter, 1954, pages 429, 432 and 433.

The dyeings obtained according to the process of the present invention on articles of polyacrylonitrile such as, for example, on fibres, filaments, woven or knitted fabrics, are distinguished by a very good levelness. The dyed materials moreover, possess an excellent softness and surprisingly do not show any electro-static charges.

The following examples serve to illustrate the invention without, however, limiting the scope thereof.

Example 1

10 grams of a knitted fabric of polyacrylonitrile are introduced into a dyebath having a liquor-to-goods ratio of 40:1 and containing per litre 0.05 gram of the following dyestuff

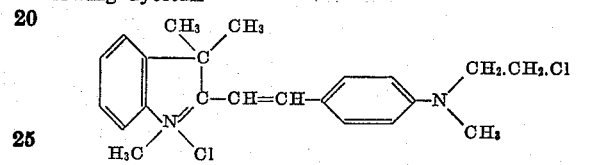

0.5 gram of glacial acetic acid, 0.5 gram of sodium acetate and 0.5 gram of 1-stearylamido-3-dimethylamino-propane-acetate. Dyeing starts at 40° C., the temperature of the bath is slowly raised to 98° C. and boiling temperature is maintained for about 1 hour.

A brilliant pink dyeing of excellent levelness is thus obtained. The dyed polyacrylonitrile fibres exhibit an outstanding full softness and have no longer any tendency to electro-static charges.

The 1-stearylamide-3-dimethylamino-propane-acetate is prepared by adding dimethylamine on acrylonitrile and subsequent reduction of the nitrile group and following heating of the resultant 3-dimethylamino-1-propylamine with stearic acid in a molecular ratio of 1:1 to 180° C. during three hours and subsequent neutralisation with acetic acid.

Example 2

10 grams of a knitted fabric of polyacrylonitrile fibres are introduced into a dyebath having a liquor-to-goods ratio of 40:1 and containing per litre 0.05 gram of the dyestuff

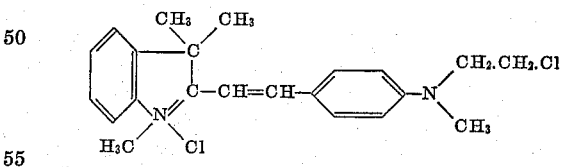

0.5 gram of glacial acetic acid, 0.5 gram of sodium acetate and 0.5 gram of the quaternary product described below. Dyeing starts at 40° C., the temperature of the bath is slowly raised to 98° C. and boiling temperature maintained for 1 hour.

A brilliant pink dyeing of excellent levelness is thus obtained. The dyed polyacrylonitrile fibres exhibit an outstanding full softness and no longer show a tendency to electrostatic charging.

The quaternary product is obtained in the following manner:

To a solution of 204 parts of N,N-dimethylamino-propylamine in 1000 parts of benzene there are added dropwise with good stirring 837 parts of an alkylsulfo-chloride obtained by the sulfochlorination of mixtures of paraffin hydrocarbons having 10–18 carbon atoms. After the mixture is stirred at room temperature for a further 2 hours, the benzenic solution of the resultant alkyl sulfamide of N,N-dimethylamino-propylamine is filtered off by suction from the separated N,N-dimethyl-amino-propyl-amine hydrochloride and the benzene is then distilled off. The residual amidoamine is then mixed with 700 parts of water, subsequently quaternized at 60–80° C. by the dropwise addition and vigorous stirring of 127 parts of benzyl chloride and the mixture kept at 80° C. for a further 2 hours.

Instead of the quaternary product indicated above there may be used with the same good result, for example, the product obtainable from lauric acid-[N,N-dimethyl-amino]-propylamide and benzyl chloride or chloroacetic acid.

We claim:

1. A process for the dyeing of articles of polyacrylonitrile with a member of the group consisting of basic dyestuffs and dispersed dyestuffs which comprises carrying out the dyeing in the presence of a member of the group consisting of amidoamines of the general formula

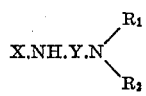

their water-soluble salts and their quaternized products wherein X stands for an acyl radical of a member selected from the group consisting of an aliphatic carboxylic acid and an aliphatic sulfonic acid, said aliphatic acids containing 10 to 18 carbon atoms and Y represents an alkylene radical having 2–6 carbon atoms whereas $R_1$ and $R_2$ stand for alkyl radicals having each 1–4 carbon atoms.

2. A process according to claim 1 wherein the amidoamine is 1-stearylamido-3-dimethylamino-propane-acetate.

3. A process according to claim 1 wherein the amidoamine is the benzene chloride quaternized derivative of an alkyl sulfamide of N,N-dimethylamino-propyl-amine, said alkyl groups being a mixture of alkyl groups having from 10 to 18 carbon atoms.

References Cited in the file of this patent

UNITED STATES PATENTS

| | | |
|---|---|---|
| 2,699,436 | D'Alelio | Jan. 11, 1955 |
| 2,836,517 | Gruber | May 27, 1958 |

FOREIGN PATENTS

| | | |
|---|---|---|
| 148,914 | Australia | Nov. 5, 1952 |